US011378386B2

(12) United States Patent
Yokoyama (10) Patent No.: US 11,378,386 B2
(45) Date of Patent: Jul. 5, 2022

(54) LASER INTERFERENCE DEVICE

(71) Applicant: MITUTOYO CORPORATION, Kanagawa (JP)

(72) Inventor: Yuichiro Yokoyama, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/160,992

(22) Filed: Jan. 28, 2021

(65) Prior Publication Data

US 2021/0247176 A1  Aug. 12, 2021

(30) Foreign Application Priority Data

Feb. 10, 2020 (JP) .............................. JP2020-020561

(51) Int. Cl.
*G01B 9/02* (2022.01)
*G01B 11/02* (2006.01)
*G02B 27/28* (2006.01)
*G01B 9/02017* (2022.01)

(52) U.S. Cl.
CPC ........ *G01B 11/026* (2013.01); *G01B 9/02019* (2013.01); *G01B 9/02021* (2013.01); *G01B 9/02034* (2013.01); *G01B 9/02049* (2013.01); *G02B 27/285* (2013.01)

(58) Field of Classification Search
CPC .............. G01B 11/026; G01B 9/02019; G01B 9/02021; G01B 9/02034; G01B 9/02049; G01B 9/02015; G01B 9/02056; G01B 9/0205; G02B 27/285
See application file for complete search history.

(56) References Cited

U.S. PATENT DOCUMENTS 3,471,239 A * 10/1969 Woodson ................. G01B 9/02
356/510
6,369,951 B1 * 4/2002 Spanner ............... G02B 27/106
359/618

FOREIGN PATENT DOCUMENTS

JP           3400393        4/2003

* cited by examiner

*Primary Examiner* — Jonathan M Hansen
(74) *Attorney, Agent, or Firm* — Greenblum & Bernstein, P.L.C.

(57) ABSTRACT

A laser interference device includes: a measurement mirror being movable in an X direction; a reference mirror disposed at a position different from a position of the measurement mirror in a Y direction; a beam splitter having a splitting surface that divides a laser beam into a measurement light and a reference light; a first light guide configured to guide the measurement light incident from the beam splitter and emit the measurement light toward the measurement mirror; and a second light guide configured to guide the reference light incident from the beam splitter and emit the reference light toward the reference mirror, in which a first distribution path formed by the first light guide and a second distribution path formed by the second light guide are mutually equal in a mechanical path length and an optical path length.

7 Claims, 6 Drawing Sheets

LASER INTERFERENCE DEVICE

The entire disclosure of Japanese Patent Application No. 2020-020561 filed Feb. 10, 2020 is expressly incorporated by reference herein.

TECHNICAL FIELD

The present invention relates to a laser interference device.

BACKGROUND ART

A laser interference device is typically used for highly accurately measuring displacement of a movable body in a measurement device, an ultraprecision machine, and the like.

Figure 6:
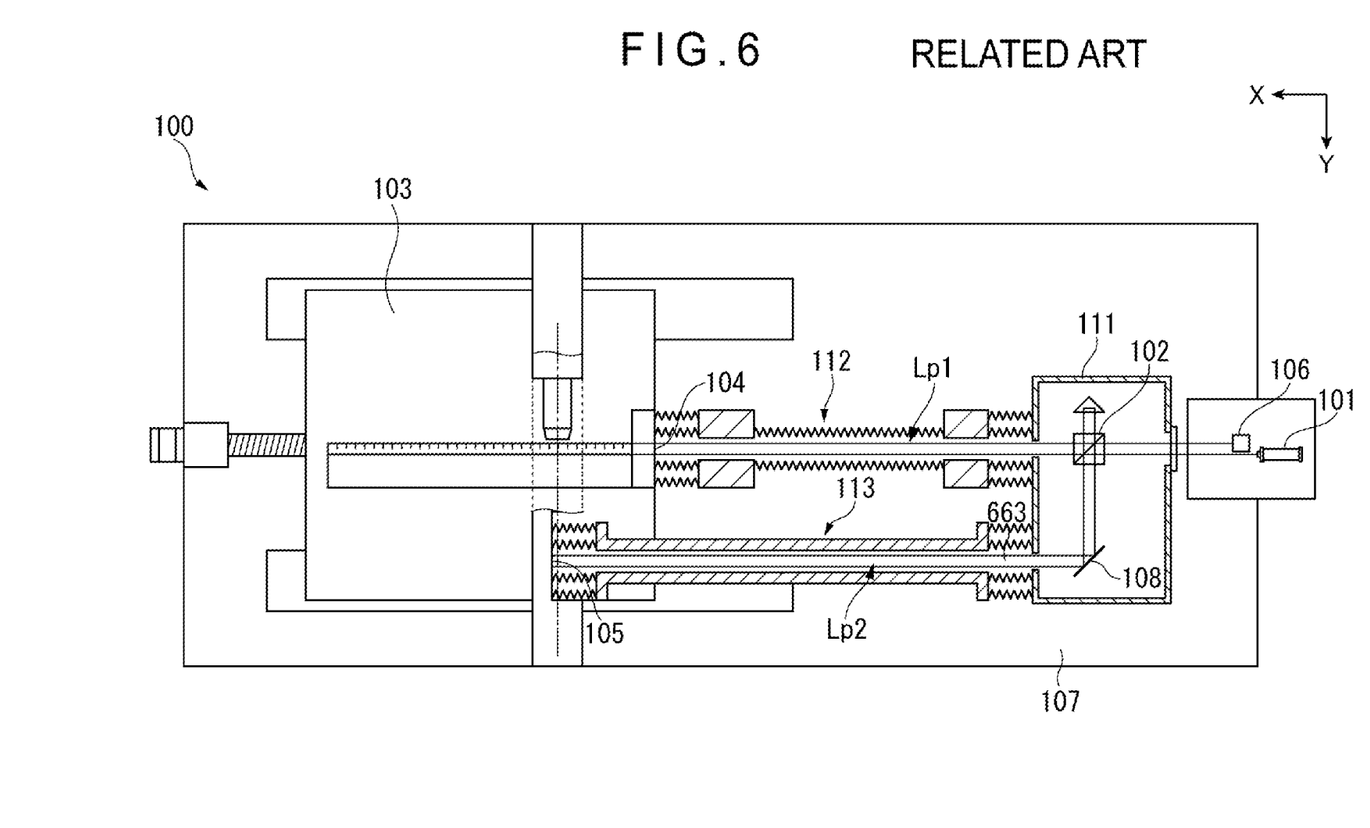
FIG. 6 is a plan view of a conventional laser interference device.

For instance, FIG. 6 is a plan view showing a laser interference device described in Patent Literature 1 (JP 3400393 B). In a laser interference device 100 shown in FIG. 6, a laser beam emitted from a laser 101 is divided by a beam splitter 102 into a measurement light and a reference light. The measurement light is reflected by a measurement mirror 104 that is movable along with a slider 103 (i.e., a movable body). The reference light is reflected by a reference mirror 105. The measurement light and the reference light reflected by the respective reflective bodies 104,105 are overlapped with each other by a beam splitter 102 to generate an interference light. Brightness of the interference light changes according to a difference in the optical path length between the measurement light and the optical path length. Accordingly, an amount of displacement of the slider 103 can be measured by detecting the interference light with a light detector 106 when the slider 103 moves, and counting interference fringes of the interference light on a basis of an output signal of the light detector 106.

In the laser interference device 100 shown in FIG. 6, in order to achieve a highly accurate measurement, a path of the measurement light (measurement optical path Lp1) extending to the measurement mirror 104 in the length measuring direction and a path of the reference light (reference optical path Lp2) extending to the reference mirror in a direction parallel to the length measuring direction are formed. With this configuration, when thermal expansion, flexure or the like occurs in a base 107 of the laser interference device 100, not only the optical path length of the measurement optical path Lp1 but also the optical path length of the reference optical path Lp2 change in the same manner, so that an error generated in a difference between the optical path lengths is reducible.

When the optical paths of the laser beam pass in the air, a refractive index of air may change due to a temperature, atmospheric pressure, humidity, carbon dioxide concentration or the like of the measurement environment to change the optical path lengths. Accordingly, in order to achieve a highly accurate measurement, the laser interference device 100 shown in FIG. 6 includes: a vacuum chamber 111 housing the beam splitter 102 and the like; an expandable measurement optical path cylinder 112 surrounding the measurement optical path Lp1; and a reference optical path cylinder 113 surrounding the reference optical path Lp2, thereby keeping the paths of the laser beam in a vacuum state.

However, the laser interference device in Patent Literature 1 described above has a disadvantage below.

As shown in FIG. 6, in the laser interference device 100 described in Patent Literature 1, the measurement light transmitted through the beam splitter 102 travels straight toward the measurement optical path cylinder 112, while the reference light reflected by the beam splitter 102 is further reflected by a mirror 108 to travel toward the reference optical path cylinder 113. Accordingly, the optical path length of the measurement light and the optical path length of the reference light are significantly different from each other in the vacuum chamber 111 of the laser interference device 100.

In the laser interference device 100 as described above, when thermal expansion occurs in the vacuum chamber 111, a change amount of the optical path length of the measurement light within the vacuum chamber 111 is different from a change amount of the optical path length of the reference light within the vacuum chamber 111, so that an error of a difference in the optical path length therebetween is generated, resulting in a decrease in the measurement accuracy.

SUMMARY OF THE INVENTION

An object of the invention is to provide a laser interference device capable of improving a measurement accuracy.

According to an aspect of the invention, a laser interference device includes: a measurement mirror being movable in a length measuring direction; a reference mirror disposed at a position different from a position of the measurement mirror in an orthogonal direction relative to the length measuring direction; a beam splitter having a splitting surface that divides a laser beam outputted from a laser into a measurement light and a reference light; a first light guide configured to guide the measurement light incident from the beam splitter and emit the measurement light toward the measurement mirror in the length measuring direction; and a second light guide configured to guide the reference light incident from the beam splitter and emit the reference light toward the reference mirror in the length measuring direction, in which a first distribution path that is a path of the measurement light from the splitting surface to a light emission surface of the first light guide and a second distribution path that is a path of the reference light from the splitting surface to a light emission surface of the second light guide are mutually equal in a mechanical path length and an optical path length.

In the above aspect of the invention, the path of the measurement light (measurement optical path) from the light emission surface of the first light guide to the measurement mirror and the path of the reference light (reference optical path) from the light emission surface of the second light guide to the reference mirror are arranged along the length measuring direction. Accordingly, similar to the above Patent Literature 1, when thermal expansion or the like occurs in the laser interference device, the respective optical path lengths of both the measurement optical path and the reference optical path change in the same manner, so that an error generated in a difference of the optical path lengths can be reduced.

In the above aspect of the invention, a path (a first distribution path) of the measurement light from the splitting surface to a light emission surface of the first light guide and a path (a second distribution path) of the reference light from the splitting surface to a light emission surface of the second light guide are mutually equal in a mechanical path length and an optical path length. Accordingly, when thermal expansion of the laser interference device occurs to cause the first light guide and the second light guide to be shifted, a change amount of the optical path length to occur in the first distribution path and a change amount of the optical path length to occur in the second distribution path can be made comparable. As a result, an error to be generated in the difference of the optical path lengths is further reducible, so that a measurement accuracy by the laser interference device is improvable.

In the laser interference device according to the above aspect, it is preferable that the first distribution path and the second distribution path are equal to each other in the mechanical path length in the length measuring direction and the orthogonal direction and the optical path length in the length measuring direction and the orthogonal direction.

With this configuration, even when an expansion degree of the laser interference device differs between the length measuring direction and the orthogonal direction, the change amount of the optical path length to occur in the first distribution path and the change amount of the optical path length to occur in the second distribution path can be made comparable. As a result, an error to be generated in the difference of the optical path lengths is further reducible, so that a measurement accuracy by the laser interference device is further improvable.

In the laser interference device according to the above aspect, it is preferable that the beam splitter is disposed on a temporary line that is equidistant from the path of the measurement light emitted from the light emission surface of the first light guide and from the path of the reference light emitted from the light emission surface of the second light guide.

With this configuration, the first distribution path and the second distribution path can be easily constructed so as to have the same path length in each of the X direction and the Y direction.

In the laser interference device according to the above aspect, it is preferable that a group of optical elements forming the first light guide and a group of optical elements forming the second light guide are mutually the same in a number, a material and a size of the optical elements.

In the above configuration, by using the same material for the group of the optical elements for the first light guide and the group of the optical elements for second light guide, the coefficient of thermal expansion that affects the mechanical path length, the refractive index that affects the optical path length, and the temperature characteristics of the refractive index can be made uniform. Further, by equalizing the number and the size between the group of the optical elements for the first light guide and the group of the optical elements for the second light guide, the total of the optical paths in the optical elements are equal. Accordingly, even when component dimensions of the optical elements change or the refractive index inside the optical elements changes due to heat transferred to the first light guide and the second light guide, the change amount of the optical path length to occur in the first distribution path and the change amount of the optical path length to occur in the second distribution path can be made comparable. Accordingly, the measurement accuracy by the laser interference device is improvable while using optical elements except for a mirror as the optical elements forming the first light guide and the second light guide.

In the laser interference device according to the above aspect of the invention, it is preferable that each of the first light guide and the second light guide includes an optical element having a posture adjustable in pitching and yawing, or two optical elements that are an optical element having a posture adjustable in pitching and an optical element having a posture adjustable in yawing.

With this configuration, each of the measurement optical path and the reference optical path can be adjusted to extend along the length measuring direction by adjusting the posture of each of the optical elements of the first light guide and the second light guide. Compared with a method of adjusting a posture of a beam splitter, the above-described adjustment method can individually adjust the measurement optical path and the reference optical path, thereby facilitating the adjustment operation.

In the laser interference device according to the above aspect of the invention, it is preferable that each of the first light guide and the second light guide includes two optical elements each having a posture adjustable in pitching and yawing.

With this configuration, by adjusting the posture of each of the optical elements of the first light guide and the second light guide, each of the measurement optical path and the reference optical path can be adjusted so as to extend along the length measuring direction and a light incident position to each of the reflective bodies can be adjusted to any position.

Compared with a method of adjusting the posture of the beam splitter, the above-described adjustment method can individually adjust the measurement optical path and the reference optical path, thereby facilitating the adjustment operation.

Moreover, the method of the above aspect of the invention is useful particularly when a corner cube is used as each of the measurement mirror and the reference mirror.

In the laser interference device according to the above aspect of the invention, it is preferable that the beam splitter is a polarization beam splitter, and each of the first light guide and the second light guide includes a polarization element.

With this configuration, when the light reflected by the measurement mirror or the reference mirror is deviated from an ideal state of a polarized light, a polarization element can function as a filter to cut unnecessary polarization components. With this configuration, the measurement accuracy can be further improved.

In the laser interference device according to the above aspect of the invention, it is preferable that the beam splitter, the first light guide and the second light guide are disposed in the air.

With this configuration, the size and the weight of the laser interference device can be reduced because a large-sized and heavy-weighted component such as a vacuum chamber is not required. Since the reduction in weight of the laser interference device can improve a natural frequency thereof, a further higher accuracy can be obtained. In the above aspect of the invention, when a refractive index of air changes due to a temperature, atmospheric pressure, humidity, carbon dioxide concentration, or the like of the measurement environment, the optical path length changes to the same extent in the first distribution path and the second distribution path, the change of the optical path length can be suppressed. In other words, the measurement accuracy is not reduced even when the optical paths of the laser beam are in the air.

DESCRIPTION OF EMBODIMENT(S)

Figure 1:
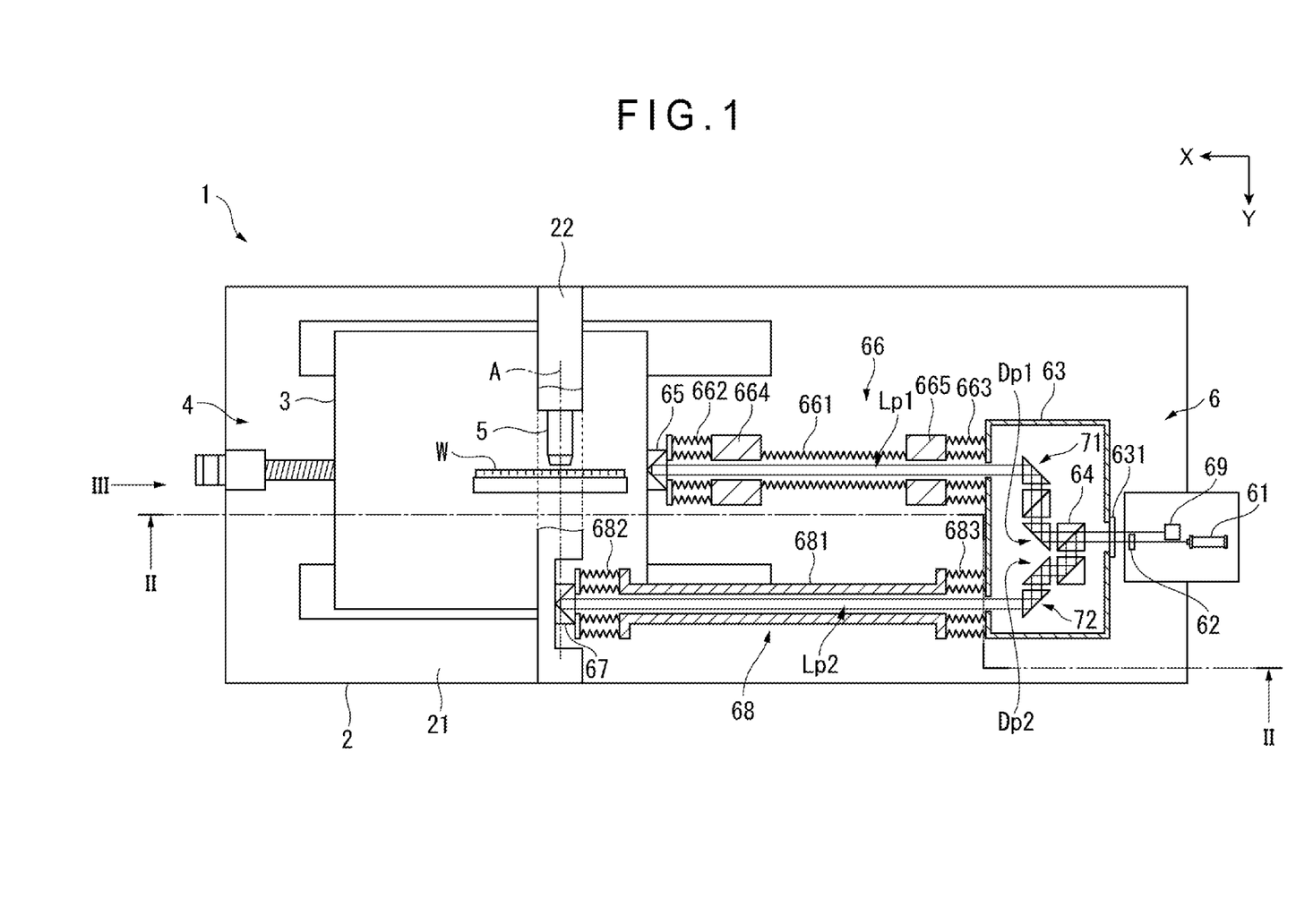
FIG. 1 is a plan view of a laser interference device according to an exemplary embodiment of the invention.
Figure 2:
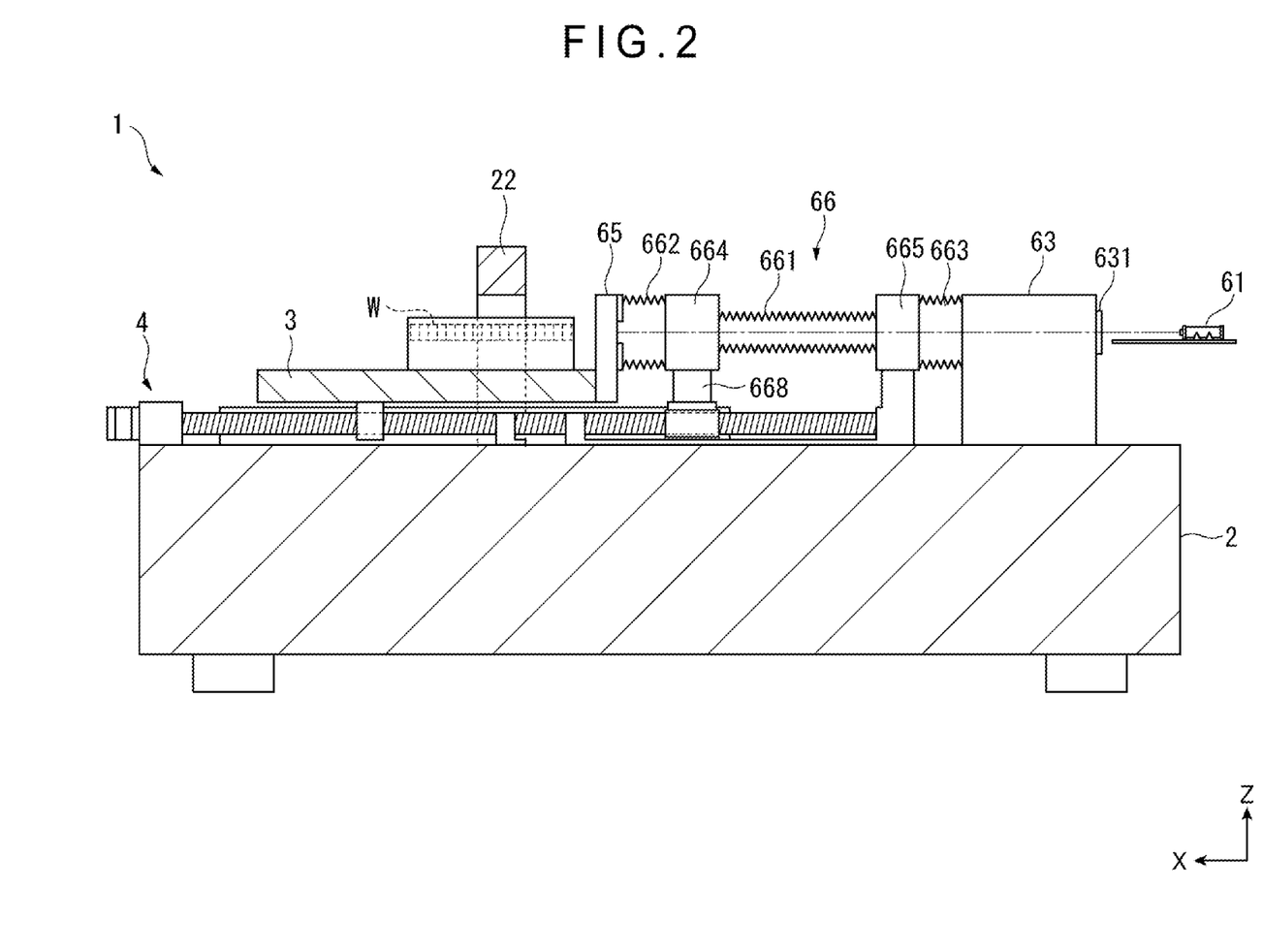
FIG. 2 is a cross-sectional view taken along a II-II line of the laser interference device shown in FIG. 1.
Figure 3:
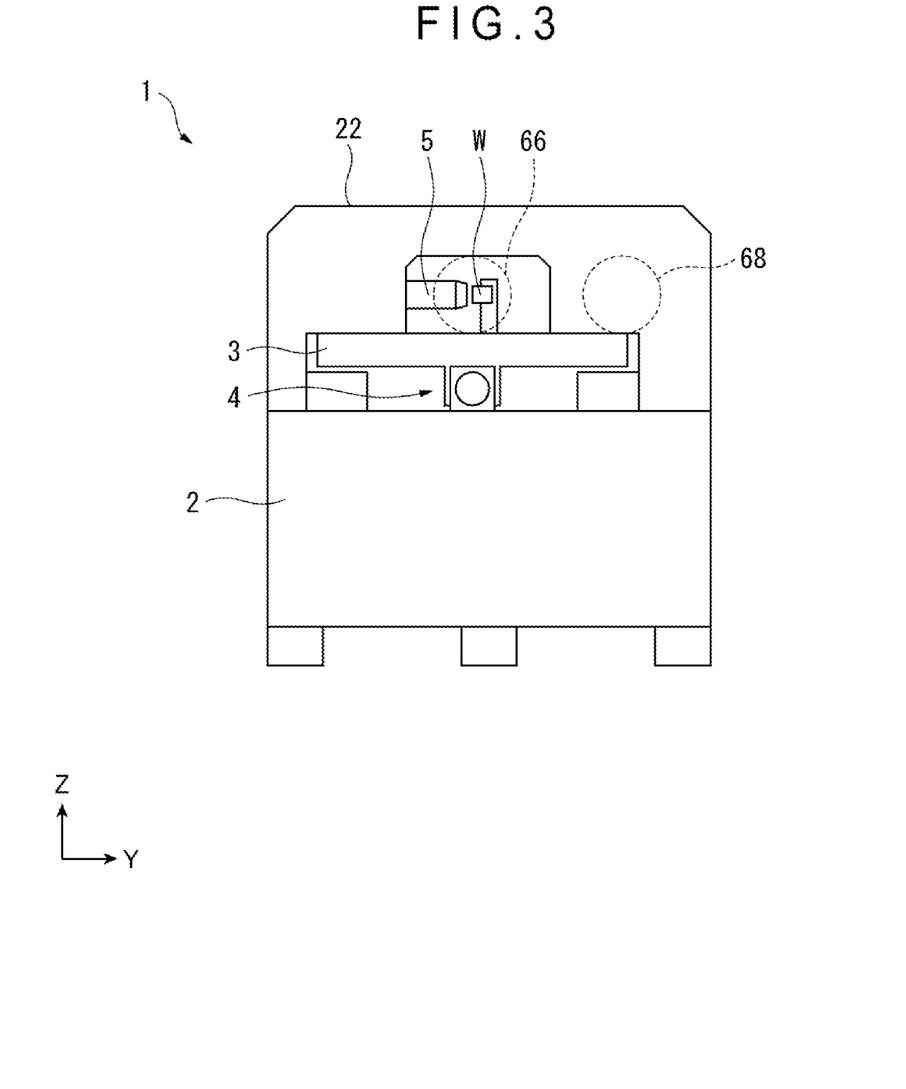
FIG. 3 is a side elevational view of the laser interference device shown in FIG. 1 and viewed from a direction of an arrow III.

An exemplary embodiment of the invention will be described with reference to FIGS. 1 to 4. FIG. 1 shows a laser interference device 1 with upper portions of some components cut in order to illustrate optical paths of laser beam.

The laser interference device 1 of the exemplary embodiment can detect an amount of displacement of a slider 3 movable in one direction while observing a workpiece W placed on the slider 3.

Specifically, the workpiece W in the exemplary embodiment is a line standard, and the laser interference device 1 is configured to evaluate an accuracy of the line standard by calculating a deviation of an interval between graduation lines of the line standard detected by a photoelectric microscope 5 with reference to the amount of displacement of the slider 3 detected by a laser interferometer 6.

Laser Interference Device 1

Firstly, an overall configuration of the laser interference device 1 will be described.

The laser interference device 1 includes: a base 2; the slider 3 movable with respect to the base 2; a drive mechanism 4 configured to drive the slider 3; the photoelectric microscope 5 configured to observe the workpiece W placed on the slider 3; and a laser interferometer 6 configured to detect displacement of the slider 3.

The base 2 has an upper surface 21 that is horizontally positioned. The slider 3, the laser interferometer 6 and the like are disposed on the upper surface 21. The base 2 also has a bridge structure 22 disposed across the slider 3. Both legs of the bridge structure 22 are fixed to the base 2.

The slider 3 is movable in one direction (hereinafter, referred to as an X direction) parallel to the upper surface 21 of the base 2.

The workpiece W is set on the slider 3. The workpiece W is preferably disposed on the same line as the center of a later-described measurement optical path cylinder 66.

The drive mechanism 4, for instance, in a form of a feed screw mechanism, drives the slider 3 in the X direction. Moreover, the drive mechanism 4 is connected to not only the slider 3 but also a carriage 668 of the laser interferometer 6 and drives the carriage 668 as well as the slider 3 in the X direction.

The photoelectric microscope 5 is supported by the bridge structure 22 above the slider 3. In the exemplary embodiment, an observation optical axis A of the photoelectric microscope 5 is positioned along an orthogonal direction (hereinafter, referred to as a Y direction) parallel to the upper surface 21 of the base 2 and orthogonal to the X direction, whereby the workpiece W placed on the slider 3 can be observed with the photoelectric microscope 5.

The laser interferometer 6, which is described later, outputs an interference light for detecting the displacement of the slider 3 with use of the principle of the interferometer.

Laser Interferometer 6

Next, a configuration of the laser interferometer 6 will be described.

The laser interferometer 6 includes a laser 61, half-wave plate 62, vacuum chamber 63, beam splitter 64, first light guide 71, second light guide 72, measurement mirror 65, measurement optical path cylinder 66, reference mirror 67, reference optical path cylinder 68, and detector 69.

The laser 61, which is, for instance, He—Ne laser, emits laser beam having a stable frequency.

The half-wave plate 62 adjusts a polarization state of the laser beam emitted from the laser 61.

The vacuum chamber 63 is a container housing the beam splitter 64, the first light guide 71 and the second light guide 72. A space inside the vacuum chamber 63 is kept in a vacuum state. Moreover, the vacuum chamber 63 has a window 631 through which the laser beam, which has been emitted from the laser 61 and then has traveled through the half-wave plate 62, travels.

Figure 4:
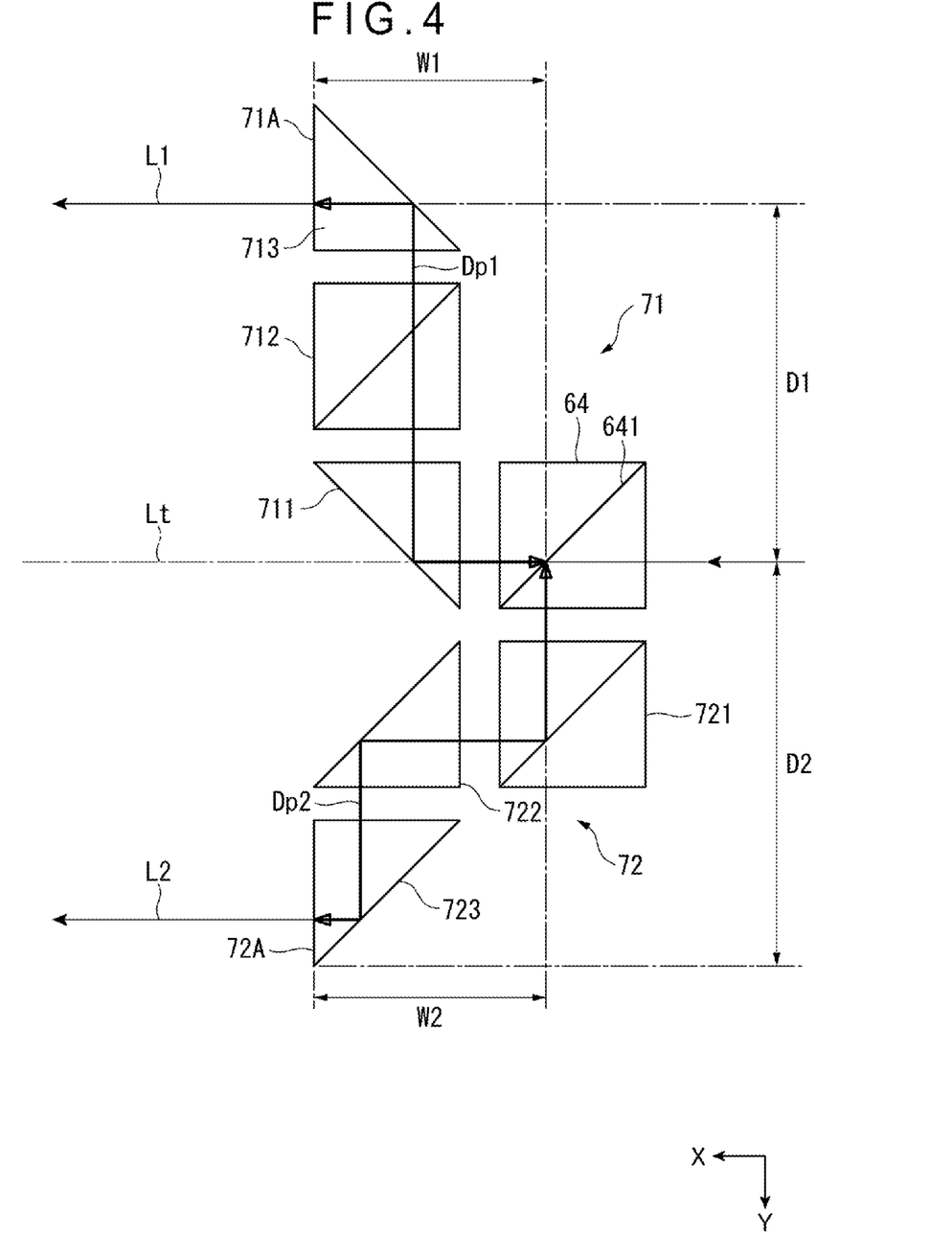
FIG. 4 is a schematic diagram showing a first light guide and a second light guide in the exemplary embodiment.

The beam splitter 64, which corresponds to a beam splitter of the invention, has a splitting surface 641 splitting incident light into transmitted light and reflected light (see FIG. 4). The beam splitter 64 in the exemplary embodiment is a polarization beam splitter. Of the laser beam that has been emitted from the laser 61 and then has transmitted through the half-wave plate 62, the beam splitter 64 transmits a P-polarized light to emit it as a measurement light and reflects an S-polarized light to emit it as a reference light.

The beam splitter 64 synthesizes the measurement light returned by being reflected by the measurement mirror 65 and the reference light returned by being reflected by the reference mirror 67

The first light guide 71 includes a group of optical elements. The first light guide 71 guides a measurement light emitted from the beam splitter 64 to emit the measurement light in a length measuring direction (X direction), thereby forming a linear measurement optical path Lp1 between the first light guide 71 and the measurement mirror 65. Moreover, the first light guide 71 guides the measurement light, which is reflected by the measurement mirror 65 to return through the measurement optical path Lp1, to the beam splitter 64.

The second light guide 72 includes a group of optical elements same as those of the first light guide 71. The second light guide 72 guides a reference light emitted from the beam splitter 64 to emit the reference light in the length measuring direction (X direction), thereby forming a reference optical path Lp2, which is in parallel to the measurement optical path Lp1, between the second light guide 72 and the reference mirror 67. Moreover, the second light guide 72 guides the reference light, which is reflected by the reference mirror 67 to return through the reference optical path Lp2, to the beam splitter 64.

It should be noted that the measurement optical path Lp1, the reference optical path Lp2 and the observation optical axis A are disposed at the same position in a direction perpendicular to a surface of a base (hereinafter, referred to as a Z direction).

The measurement mirror 65 is attached to the slider 3 and is movable in the X direction along with the slider 3. The measurement mirror 65 is, for instance, a retroreflector such as a corner cube prism and retroreflects the measurement light emitted from the first light guide 71.

The measurement optical path cylinder 66 is located along the X direction in a manner to surround the measurement optical path Lp1. One end of the measurement optical path cylinder 66 is connected to the vacuum chamber 63 while the other end of the measurement optical path cylinder 66 is connected to the measurement mirror 65. The measurement optical path cylinder 66 is configured to expand and contract in the X direction in conjunction with the movement of the measurement mirror 65 in the X direction.

Specifically, the measurement optical path cylinder 66 is provided by coupling a bellows 661, double bellows 662, 663, and intermediate cylinders 664, 665. Each of the double bellows 662, 663 has a double structure that defines an inner space and an outer space and is in a balanced pressure by keeping the inner space in a vacuum state and keeping the outer space at a predetermined pressure equal to or higher than the atmospheric pressure. The intermediate cylinder 664 is supported by the carriage 668 movable in the X direction and is driven in the X direction by the drive mechanism 4.

The reference mirror 67 is placed on the observation optical axis A of the photoelectric microscope 5 and is attached to the bridge structure 22. The reference mirror 67 is, for instance, a retroreflector such as a corner cube prism and retroreflects the reference light emitted from the second light guide 72.

The reference optical path cylinder 68 is located along the X direction in a manner to surround the reference optical path Lp2. One end of the reference optical path cylinder 68 is connected to the vacuum chamber 63 while the other end of the reference optical path cylinder 68 is connected to the reference mirror 67.

Specifically, the reference optical path cylinder 68 includes a pipe structure 681, and double bellows 682, 683 provided to respective ends of the pipe structure 681. The double bellows 682, 683 each have the above-described double structure same as the double bellows 662, 663. The reference optical path cylinder 68, which is not supposed to expand and contract, has the double bellows 682, 683, whereby loads can be prevented from being generated in the X direction when each of the components of the laser interference device 1 is thermally expanded.

The detector 69 generates an interference light by causing the measurement light and the reference light merged on the same axis by the beam splitter 64 to interfere with each other, and outputs a detection signal obtained by photoelectrically converting the interference light. A specific detection method by the detector 69 is not particularly limited. For instance, the detector 69 may divide the beam of the measurement light and the reference light merged on the same axis by the beam splitter 64 into a plurality of beams, generate a plurality of interference lights with any phase differences from the plurality of beams, and photoelectrically convert the plurality of interference lights to output a plurality of detection signals usable for displacement detection and respective directional valves. The detector 69 is connected to an external signal processor. The signal processor process the detection signal to calculate a displacement amount and the like of the measurement mirror 65. Since known techniques can be used for specific configurations of the detector 69 and the signal processor, description thereof is omitted.

First Light Guide 71 and Second Light Guide 72

Next, a configuration of each of the first light guide 71 and the second light guide 72 is described with reference to FIG. 4. FIG. 4 shows the beam splitter 64, the first light guide 71 and the second light guide 72 which are disposed in the vacuum chamber 63.

In the exemplary embodiment, each of the first light guide 71 and the second light guide 72 includes a plurality of optical elements disposed on the same XY plane.

Specifically, the first light guide 71 includes a right-angle prism 711, a polarization beam splitter 712 and a right-angle prism 713 sequentially from a side close to the beam splitter 64. The second light guide 72 includes a polarization beam splitter 721 and right-angle prisms 722, 723 sequentially from a side close to the beam splitter 64.

Herein, the polarization beam splitters 712, 721 are mutually equal in size and refractive index of a material. The right-angle prisms 711, 713, 722, 723 are mutually equal in size and refractive index of a material.

In other words, the group of optical elements forming the first light guide 71 and the group of optical elements forming the second light guide 72 are mutually the same in the number, material and size of the optical elements.

In the above configuration, in the first light guide 71, the measurement light L1 passing through the beam splitter 64 is reflected by the right-angle prism 711 to pass through the polarization beam splitter 712, and is reflected by the right-angle prism 713 to be emitted in the length measuring direction (X direction).

Meanwhile, in the second light guide 72, the reference light L2 reflected by the beam splitter 64 is reflected by the polarization beam splitter 721 and then is reflected by the right-angle prism 722 and the right-angle prism 723 to be emitted in the length measuring direction (X direction).

Here, provided that a path of the measurement light from the splitting surface 641 of the beam splitter 64 to a light emission surface 71A of the first light guide 71 is defined as a first distribution path Dp1, and a path of the reference light from the splitting surface 641 to a light emission surface 72A of the second light guide 72 is defined as a second distribution path Dp2, the first distribution path Dp1 and the second distribution path Dp2 are mutually equal in mechanical path length and optical path length.

It should be noted that the optical path length is a length obtained by multiplying a mechanical path length of a path through which light passes by a refractive index of a medium forming the path.

The beam splitter 64 is positioned on a temporary line Lt that is equidistant from the path (the measurement optical path Lp1 in FIG. 1) of the measurement light L1 emitted from the light emission surface 71A of the first light guide 71 and from the path (the reference optical path Lp2 in FIG. 1) of the reference light L2 emitted from the light emission surface 72A of the second light guide 72. With this configuration, the first distribution path Dp1 and the second distribution path Dp2 are formed so that mechanical path lengths W1 and W2 in the X direction are equal to each other and mechanical path lengths D1 and D2 in the Y direction are equal to each other.

In the first light guide 71, each of the right-angle prisms 711, 713 has a posture adjustable in both pitching and yawing.

Likewise, in the second light guide 72, each of the right-angle prisms 722, 723 has a posture adjustable in both pitching and yawing.

Effects

In the laser interference device 1 of the exemplary embodiment, the measurement optical path Lp1 and the reference optical path Lp2 are provided along the length measuring direction (X direction). Accordingly, similar to the above Patent Literature 1, when thermal expansion or the like occurs in the laser interference device 1, the respective optical path lengths of both the measurement optical path Lp1 and the reference optical path Lp2 change in the same manner, so that an error generated in a difference of the optical path lengths can be reduced.

In the exemplary embodiment, the first distribution path Dp1 and the second distribution path Dp2 are mutually equal in the mechanical path lengths and the optical path lengths. Accordingly, when the vacuum chamber 63 thermally expands to cause the optical elements of the first light guide 71 and the second light guide 72 to be shifted, a change amount of the optical path length to occur in the first distribution path Dp1 and a change amount of the optical path length to occur in the second distribution path Dp2 can be made comparable. As a result, an error to be generated in the difference of the optical path lengths is further reducible, so that a measurement accuracy by the laser interference device 1 is improvable.

In the exemplary embodiment, due to the disposition of the beam splitter 64, the first distribution path Dp1 and the second distribution path Dp2 are configured to be equal to each other in each of the X direction and the Y direction.

Accordingly, regardless of whether thermal expansion occurs in the X direction or Y direction, the change amount of the optical path length to occur in the first distribution path Dp1 and the change amount of the optical path length to occur in the second distribution path Dp2 can be made comparable. As a result, an error to occur in the difference of the optical path lengths is further reducible, so that a measurement accuracy by the laser interference device 1 is further improvable.

In the exemplary embodiment, by using the same material for the group of the optical elements for the first light guide 71 and the group of the optical elements for the second light guide 72, the coefficient of thermal expansion that affects the mechanical path length, the refractive index that affects the optical path length, and the temperature characteristics of the refractive index can be made uniform. Further, by equalizing the number and the size between the group of the optical elements for the first light guide 71 and the group of the optical elements for the second light guide 72, the total of the optical paths in the optical elements are equal. Accordingly, even when component dimensions of the optical elements change or the refractive index inside the optical elements changes due to the heat transferred to the first light guide 71 and the second light guide 72, the change amount of the optical path length to occur in the first distribution path Dp1 and the change amount of the optical path length to occur in the second distribution path Dp2 can be made comparable. Accordingly, the measurement accuracy by the laser interference device 1 is improvable while using optical elements except for a mirror as the optical elements forming the first light guide 71 and the second light guide 72.

In the exemplary embodiment, by adjusting the pitching and the yawing of each of the right-angle prisms 711, 713, the measurement optical path Lp1 is adjustable in a manner to be parallel to the length measuring direction and be incident to any position of the measurement mirror 65. Likewise, by adjusting the pitching and the yawing of each of the right-angle prisms 722, 723, the reference optical path Lp2 is adjustable in a manner to be parallel to the length measuring direction and be incident to any position of the reference mirror 67. Compared with a method of adjusting a posture of the beam splitter 64, the above-described adjustment method can individually adjust the measurement optical path Lp1 and the reference optical path Lp2 and separately adjust the pitching and the yawing, thereby facilitating the adjustment operation.

In the exemplary embodiment, the beam splitter 64 is a polarization beam splitter, the first light guide 71 and the second light guide 72 include the polarization beam splitters 712, 721, respectively. In this configuration, when the measurement light reflected by the measurement mirror 65 or the reference light reflected by the reference mirror 67 is deviated from an ideal state of a polarized light, the polarization beam splitters 712, 721 can function as a filter to cut unnecessary polarization components. With this configuration, the measurement accuracy can be further improved.

Modification(s)

The invention is not limited to the above exemplary embodiment, and modifications and the like that are compatible with an object of the invention are within the scope of the invention.

Although the laser interference device 1 of the exemplary embodiment includes the vacuum chamber 63, the vacuum chamber 63 may be omitted. In this configuration, the respective double bellows 663, 683 of the measurement optical path cylinder 66 and the reference optical path cylinder 68 connected to the vacuum chamber 63 are also omitted.

Figure 5:
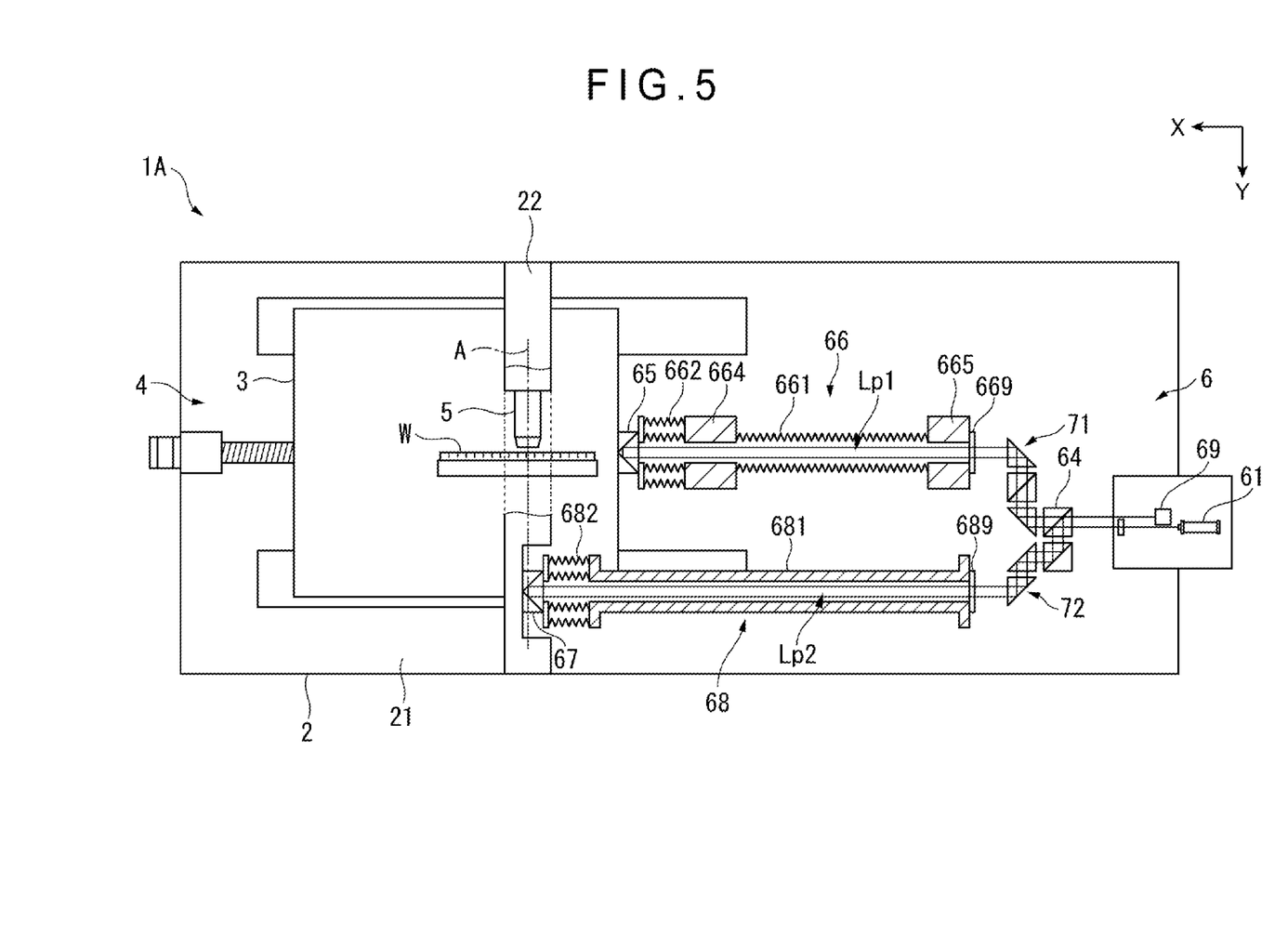
FIG. 5 is a plan view of a laser interference device according to a modification of the above exemplary embodiment.

For instance, FIG. 5 is an illustration showing a laser interference device 1A according to a modification of the above exemplary embodiment. As shown in FIG. 5, the beam splitter 64, the first light guide 71 and the second light guide 72 are disposed to the base 2 under an air environment. The respective ends of the measurement optical path cylinder 66 and the reference optical path cylinder 68 are closed by windows 669, 689 that transmit the laser beam.

In such a modification, the size and the weight of the laser interference device 1 can be reduced by not using a large-sized and heavy-weighted component such as the vacuum chamber 63. Since the reduction in weight of the laser interference device 1 can improve a natural frequency thereof, a further higher accuracy can be obtained.

In this modification, although not shown, a cover for preventing air vibration is preferably used in place of the vacuum chamber 63.

Moreover, in this modification, when a refractive index of air changes due to a temperature, atmospheric pressure, humidity, carbon dioxide concentration, or the like of the measurement environment, the optical path length changes to the same extent in the first distribution path Dp1 and the second distribution path Dp2, whereby the change of the optical path length can be suppressed. In other words, the measurement accuracy is not reduced even when the optical path of the laser beam is in the air.

In the above exemplary embodiment, as long as the condition that the first distribution path Dp1 and the second distribution path Dp2 are equal to each other in the mechanical path length and the optical path length is satisfied, the group of optical elements forming each of the first light guide 71 and the second light guide 72 can be altered in the number, material, size, type, arrangement, and the like of the optical elements.

For instance, although being mutually the same in the number of the types, material and size of the optical elements in the above exemplary embodiment, the group of optical elements forming the first light guide 71 and the group of optical elements forming the second light guide 72 may be different in at least one of the number of the types, material and size.

Moreover, although the inner surface of each of the right-angle prisms 711, 713, 722, 723 is used as the reflective surface in the above exemplary embodiment, an outer surface of each of the right-angle prisms 711, 713, 722, 723 may be used as the reflective surface. Alternatively, a plane mirror may be used in place of each of the right-angle prisms 711, 713, 722, 723.

In the above exemplary embodiment, the beam splitter 64 that is the polarization beam splitter is described as the beam splitter of the invention. However, the beam splitter of the invention is not limited to the beam splitter 64. For instance, the function of dividing the laser beam into the measurement light and the reference light and the function of synthesizing the measurement light and the reference light may be realized by separate members.

In the above exemplary embodiment, the polarization beam splitters 712, 721 are described as the polarization element of the invention. However, the polarization element of the invention is not limited to the polarization beam splitters 712, 721. For instance, the first light guide 71 and the second light guide 72 may each include a polarization element other than the polarization beam splitters 712, 721.

In the above exemplary embodiment, the case where the measurement mirror 65 and the reference mirror 67 are corner cubes is shown as an example. However, the invention is not limited to this case.

For instance, a plane mirror may be used as each of the measurement mirror 65 and the reference mirror 67 so that the laser interferometer 6 does not use a polarized light.

In such a case, one of the right-angle prisms 711, 713 of the first light guide 71 may have a posture adjustable in pitching and yawing. Alternatively, one of the right-angle prisms 711, 713 of the first light guide 71 may have a posture adjustable in pitching and the other of the right-angle prisms 711, 713 may have a posture adjustable in yawing. With this configuration, the measurement optical path Lp1 can be adjusted in parallel to the length measuring direction. It should be noted that the same configuration as the first light guide 71 applies to the second light guide 72.

The laser interference device 1 in the above exemplary embodiment includes the photoelectric microscope 5. However, the configuration of the laser interference device of the invention is not limited thereto. For instance, the laser interference device may include a probe, a machining tool or an exposure optical system. For instance, when a resist-coated substrate for a line standard is a workpiece W, the laser interference device 1 may include an exposure optical system configured to expose a memory pattern on the substrate for the line standard, in place of the photoelectric microscope 5.

In addition, the invention is applicable to various laser interference devices for measuring an amount of displacement of a moving body.

What is claimed is:

1. A laser interference device comprising:
a measurement mirror being movable in a length measuring direction;
a reference mirror disposed at a position different from a position of the measurement mirror in an orthogonal direction relative to the length measuring direction;
a beam splitter having a splitting surface that divides a laser beam outputted from a laser into a measurement light and a reference light;
a first light guide configured to guide the measurement light incident from the beam splitter and emit the measurement light toward the measurement mirror in the length measuring direction; and
a second light guide configured to guide the reference light incident from the beam splitter and emit the reference light toward the reference mirror in the length measuring direction, wherein
a first distribution path that is a path of the measurement light from the splitting surface to a light emission surface of the first light guide and a second distribution path that is a path of the reference light from the splitting surface to a light emission surface of the second light guide are mutually equal in a mechanical path length and an optical path length, and
wherein a group of a plurality of optical elements forming the first light guide and a group of a plurality of optical elements forming the second light guide are mutually the same in a number, a material, and a size of the optical elements.

2. The laser interference device according to claim 1, wherein
the first distribution path and the second distribution path are equal to each other in the mechanical path length in the length measuring direction and the orthogonal direction and in the optical path length in the length measuring direction and the orthogonal direction.

3. The laser interference device according to claim 2, wherein
the beam splitter is disposed on a temporary line that is equidistant from the path of the measurement light emitted from the light emission surface of the first light guide and from the path of the reference light emitted from the light emission surface of the second light guide.

4. The laser interference device according to claim 1, wherein
each of the first light guide and the second light guide comprises an optical element, among the plurality of optical elements, having a posture adjustable in pitching and yawing, or two optical elements, among the plurality of optical elements, that are an optical element having a posture adjustable in pitching and an optical element having a posture adjustable in yawing.

5. The laser interference device according to claim 1, wherein
each of the first light guide and the second light guide comprises two optical elements, among the plurality of optical elements, each having a posture adjustable in pitching and yawing.

6. The laser interference device according to claim 1, wherein
the beam splitter is a polarization beam splitter, and
each of the first light guide and the second light guide comprises a polarization element.

7. The laser interference device according to claim 1, wherein
the beam splitter, the first light guide and the second light guide are disposed in the air.

* * * * *